June 8, 1937.  J. H. HUNT  2,083,066
VEHICLE WHEEL
Filed July 27, 1933  2 Sheets-Sheet 1
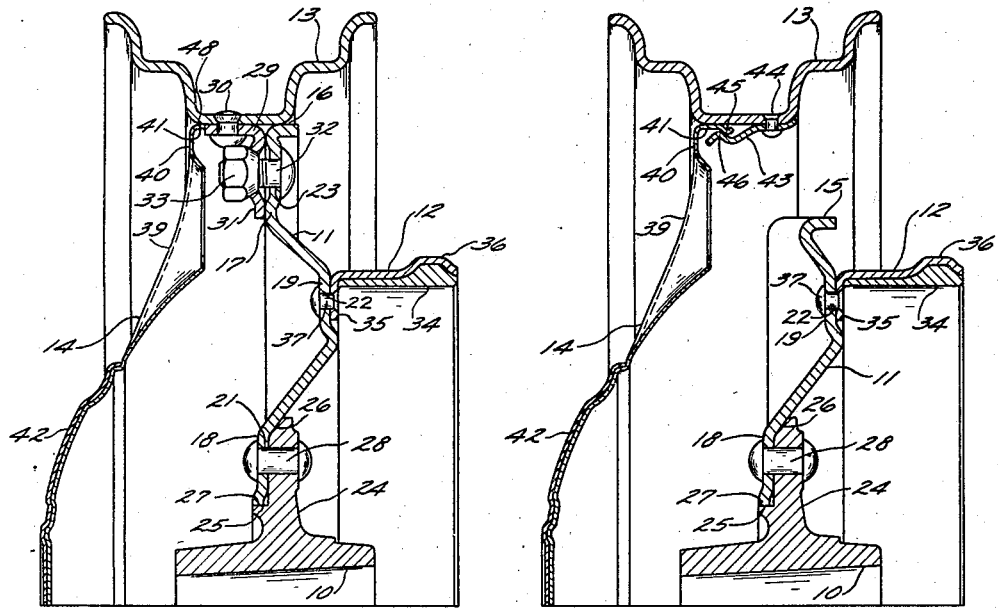
FIG. I  FIG. II
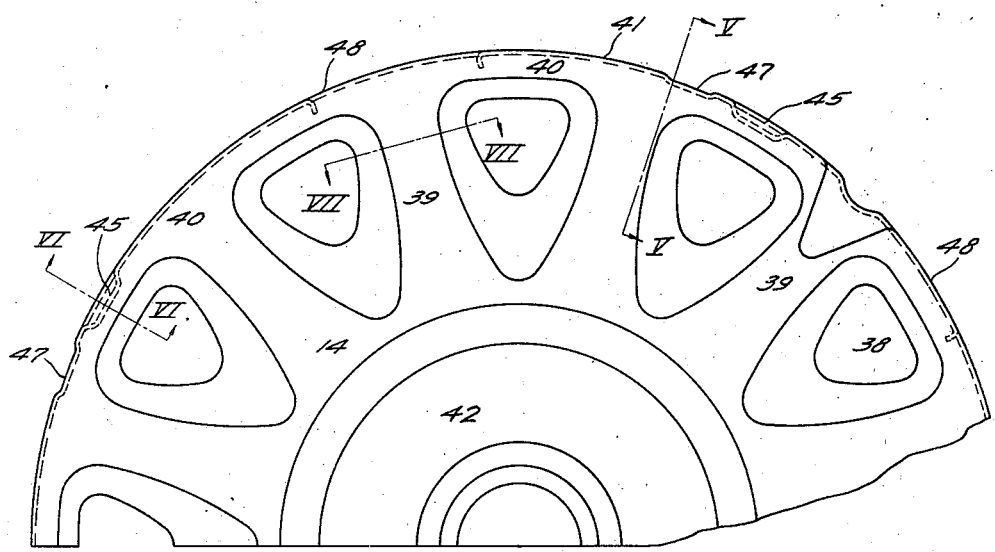
FIG. III
INVENTOR.
J Harold Hunt
BY
Carroll R. Taber
HIS ATTORNEY.

June 8, 1937.  J H. HUNT  2,083,066
VEHICLE WHEEL
Filed July 27, 1933   2 Sheets-Sheet 2
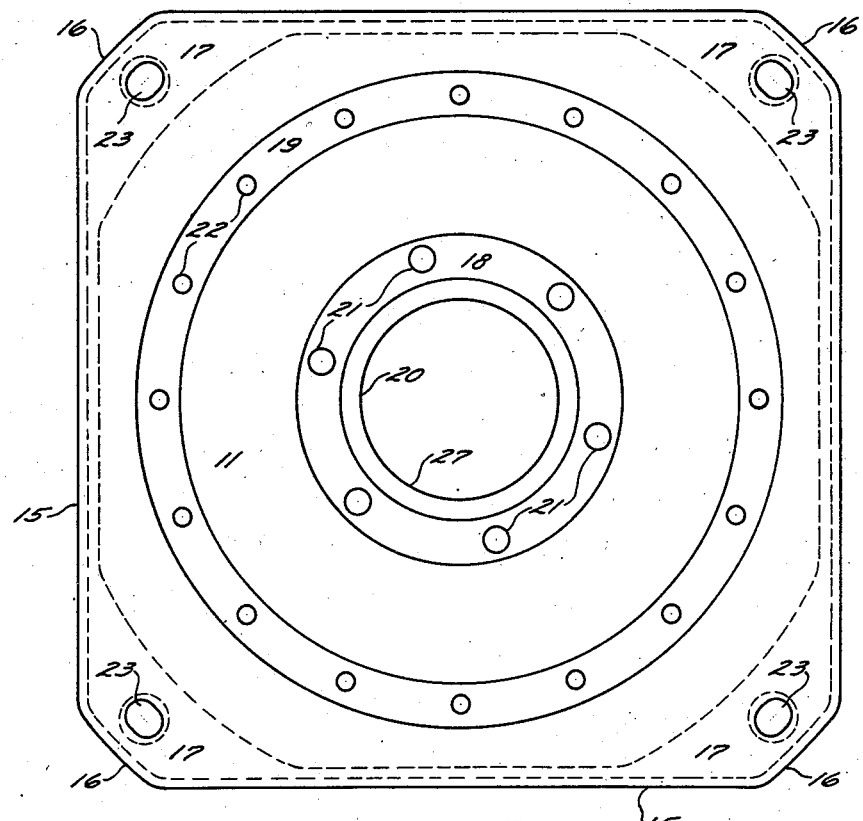
FIG. IV
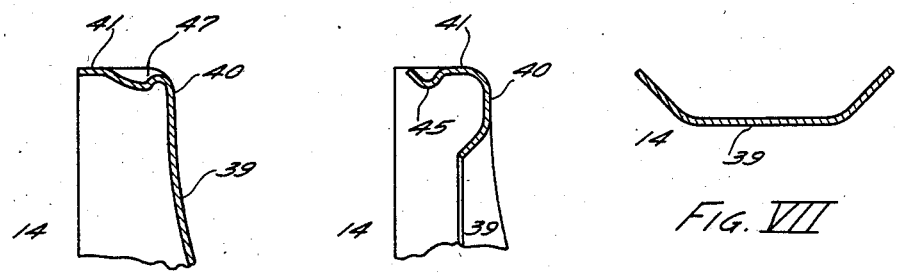
FIG. V    FIG. VI    FIG. VII
INVENTOR.
J Harold Hunt
BY
Carroll R. Taber
HIS ATTORNEY.

Patented June 8, 1937

2,083,066

UNITED STATES PATENT OFFICE 2,083,066

VEHICLE WHEEL

J Harold Hunt, Lansing, Mich., assignor to Motor Wheel Corporation, Lansing, Mich., a corporation of Michigan Application July 27, 1933, Serial No. 682,373

6 Claims. (Cl. 301—63)

This invention relates to vehicle wheels and more particularly to a novel wheel body interposed between a conventional hub and rim and the combination therewith of a cover therefor.

The principal feature of the invention consists in the provision of a wheel body comprising a substantially square blank of sheet metal. This blank is adapted to be attached centrally to a wheel hub. A wheel rim is mounted upon the perimeter of the blank. Normally the rim does not contact the blank but is supported by the lugs carried thereby. The corners of the blank serve to center the rim when it is mounted.

The rim is preferably of the demountable type having four attaching lugs permanently connected to the inner surface thereof. These lugs have radially extending portions adapted to contact corresponding portions of the wheel body at the corners thereof. The lugs are demountably attached to the wheel body by means of securing bolts.

The sheet metal wheel body is preferably formed with its inner hub attaching zone and outer rim attaching zone lying in substantially the same radial plane and with an intermediate brake drum attaching zone lying in a radial plane spaced from the plane of the said other zones. The brake drum is permanently attached to the mid portion of the wheel body.

By reason of the square formation of the sheet metal wheel body the rim is spaced radially from the portions of the perimeter of the wheel body intermediate the corners thereof. A cover is therefore preferably provided to conceal the unfinished appearance of the wheel body. The cover may be of any desired form and is preferably detachably connected directly to the inner surface of the rim by means of a plurality of resilient fasteners secured to the inner surface of the rim intermediate the attaching lugs. The cover is provided with a laterally extending peripheral flange adapted to contact the inner surface of the rim whereby to present a finished appearance for the outside of a wheel. Where the cover is held in position by resilient fasteners carried by the rim a suitable slot or groove is provided in the cover adjacent its periphery for the reception of a prying tool by means of which the cover may be removed.

The preferred embodiment of the present invention is illustrated in the accompanying drawings wherein:

Figure I is a partial cross sectional view of a vehicle wheel;

Figure II is a partial cross sectional view through another portion of the same wheel;

Figure III is a partial front view in elevation of the cover shown in Figures I and II;

Figure IV is a front view in elevation of the wheel body forming a part of the wheel illustrated in Figures I and II;

Figure V is a cross sectional view through the cover taken on substantially the line V—V of Figure III;

Figure VI is a cross sectional view through the cover taken on substantially the line VI—VI of Figure III; and Figure VII is a cross sectional view through the cover taken on substantially the line VII—VII of Figure III.

The wheel illustrated in Figures I and II comprises a hub 10, a wheel body 11, a brake drum 12, a rim 13, and a cover 14.

The wheel body 11, as best shown in Figure IV, consists of a square blank preferably formed of sheet metal. The corner portions of the blank are cut away as shown and a laterally extending flange 15 is formed about the perimeter of the blank. The flange 15 thus provides a rim centering seat 16 at each corner of the blank in the form of a segment of a cylinder.

The wheel body is deeply dished in its intermediate portion to provide an outer rim attaching zone represented by flat radial extending portions 17 at each corner, an inner hub attaching zone comprising a radially extending annular portion 18 and an intermediate brake drum attaching zone comprising a radially extending annular portion 19. As best shown in Figure I, the rim and hub attaching zones lie in substantially the same radial plane while the brake drum attaching zone lies in a radial plane spaced axially inward from the said other zones.

A circular opening 20 is provided in the center of the wheel body. Suitable openings 21 for the reception of attaching means are formed in the hub attaching zone 18. Similar openings 22 for the reception of attaching means are formed in the brake drum attaching zone 19. A single opening 23 for the reception of a stud is formed in the rim attaching zone 17 adjacent each corner of the wheel body.

The hub 10 has the usual radially extending flange 24 provided with a shoulder 25 adjacent its inner extremity and an inclined annular contacting surface 26 adjacent its outer extremity. The wheel body 11 is mounted upon the hub with its inner edge 27, defining the central opening 20, seated upon the shoulder 25 with its annular hub attaching zone 18 contacting the face of the hub flange 24 and with its dished annular portion immediately adjacent the hub attaching zone 18 contacting the inclined annular surface 26. The hub flange 24 is provided with openings registering with the openings 21 in the wheel body. Rivets 28 extending through these registering openings permanently attach the wheel body to the hub flange.

Four circumferentially spaced apart rim attaching lugs 29 are permanently secured to the inner surface of the base of the rim 13 by rivets 30. Each rim attaching lug 29 includes a radially extending portion 31 provided with an opening adapted to register with the openings 23 in the rim attaching zone 17 of the wheel body. A securing bolt 32 projecting through each of the openings 23 and which is preferably permanently attached to the wheel body extends through the opening in the radial portion 31 of each of the lugs 29 when the rim is mounted upon the circumferentially spaced apart rim seats 16. The rim is held in position upon the wheel body by means of nuts 33 threaded on to the outer extremity of the bolts 32 whereby the radially extending portion 31 of the lug is locked against the radially extending portions 17 of the wheel body.

When the rim is thus secured in position it may contact the rim seats 16 or may be spaced slightly therefrom but is spaced radially from the portions of the perimeter of the wheel body 11 intermediate the corners thereof, as clearly shown in Figure II.

The brake drum 12, which may be of any conventional form and which is here shown as of the type which has a cast wear-resisting inner liner 34, is provided with a radially extending attaching flange 35 at one edge thereof and a stiffening rib 36 adjacent the other edge. The radially extending attaching flange 35 is provided with circumferentially spaced apart openings adapted to register with the openings 22 in the brake drum attaching zone 19 of the wheel body. The brake drum is permanently attached to the wheel body by means of rivets 37 projecting through these registering openings.

As is well known, brake drums have a tendency to expand when subjected to severe or prolonged usage. In the present construction the wheel body 11 is designed to accommodate itself to some extent to this radial expansion and subsequent contraction of the brake drum whereby to prevent distortion thereof. This is made possible by reason of the deeply dished formation of the wheel body and the fact that the wheel body is confined by the rim only at the corners thereof.

The cover 14, which is here shown as being of generally frusto-conical formation, has a plurality of circumferentially spaced apart openings 38 formed therein adjacent the periphery thereof which provide intermediate spoke portions 39. The formation of the spokes 39 is clearly shown in Figures III and VII.

The periphery of the cover is formed with a radially extending annular portion 40 constituting a continuation of the spokes 39 and an annular integral axially extending flange 41. The central portion of the cover is preferably imperforate but designed to receive a removable disk 42 simulating the appearance of a conventional hub cap. This disk member 42 may be dispensed with entirely or may be permanently attached to the cover 14, if desired.

The cover 14 is preferably removably attached to the inner surface of the base of the rim 13 by means of resilient retention members 43 permanently secured to the inner surface of the rim 13 by means of rivets 44. The resilient retention devices 43 are secured to the rim at circumferentially spaced apart points intermediate the rim attaching lugs 29.

The peripheral flange 41 of the cover 14 is provided at circumferentially spaced apart intervals with depressed portions 45 which are engaged by the beads 46 formed adjacent the outer extremities of the retention devices 43.

Suitable grooves or slots 47 are formed in the flange 41 adjacent the depressions 45 for the reception of a tool which may be utilized for removing the cover.

When the cover is installed the peripheral flange 41 thereof contacts the inner surface of the base of the rim 13, as shown. In order to provide a snug fit between these parts the flange 41 is cut away at four points, as indicated at 48, to prevent interference with the rim attaching lugs 29.

The cover 14 may, if desired, be permanently attached to the rim 13 in which case the rim attaching lugs 29 will be suitably arranged so that access may be had to the nuts 33 through the openings 38 between the spoke portions 39. By this arrangement the rim and attached cover may be readily removed and installed. Where the cover is permanently attached to the rim it is preferably formed with a central opening which is closed by a removable hub cap similar to the false cap or decorative plate 42.

From the foregoing description it will be apparent that this invention provides a sturdy but inexpensive wheel which, when the cover is installed, presents a finished and pleasing exterior appearance. While only the preferred form of the invention has been shown and described it should be understood that the invention is not limited thereto but that it is coextensive with the scope of the appended claims.

I claim:

1. In a vehicle wheel, the combination with a rim of a wheel body therefor comprising a substantially square blank of metal of such size that the lengths of its sides are materially less and the diagonal distances between its corners are substantially equal to the internal diameter of the rim, and means for securing the rim upon the four corners of the blank.

2. In a vehicle wheel, the combination with a rim of a wheel body therefor comprising a dished substantially square blank of metal of such size that the lengths of its sides are materially less and the diagonal distances between its corners are substantially equal to the internal diameter of the rim, and means for securing the rim upon the four corners of the blank.

3. In a vehicle wheel, the combination with a rim of a wheel body therefor comprising a substantially square blank of metal having arcuate rim seats of limited circumferential extent at its four corners, the size of the blank being such that the lengths of its sides are materially less and the diagonal distances between the arcuate rim seats at the corners are substantially equal to the internal diameter of the rim, and means for securing the rim upon the arcuate rim seats at the corners of the blank.

4. In a vehicle wheel, the combination with a rim of a wheel body therefor comprising a substantially square blank of metal having a continuous flange about its perimeter forming arcuate rim seats of limited circumferential extent at each of the four corners, the size of the blank being such that the lengths of its sides are materially less and the diagonal distances between the arcuate rim seats at the corners are substantially equal to the internal diameter of the rim, and means for securing the rim upon the arcuate rim seats at the four corners of the blank.

5. In a vehicle wheel, the combination with a rim of a wheel body therefor comprising a substantially square blank of metal having axially extending arcuate rim seats of limited circumferential extent at each of the four corners and axially extending web portions along the sides of the blank between the corners, the size of the blank being such that the lengths of its sides are materially less and the diagonal distances between the arcuate rim seats at its corners are substantially equal to the internal diameter of the rim, and means for securing the rim upon the arcuate rim seats at the four corners of the blank.

6. In a vehicle wheel, the combination with a rim of a wheel body comprising a substantially square blank of metal having a central portion adapted for attachment to a wheel hub and having rim seats at each of its four corners, the size of the wheel body being such that the distance between opposite sides midway between the corners is materially less and the distances between the diagonally opposite corners are substantially equal to the internal diameter of the rim, and means for securing the rim upon the rim seats at the four corners of the wheel body.

J HAROLD HUNT.